(12) United States Patent
Brabec

(10) Patent No.: US 8,427,477 B2
(45) Date of Patent: Apr. 23, 2013

(54) METHOD AND A SYSTEM FOR GRAPHIC REPRESENTATION OF DYNAMIC INFORMATION

(75) Inventor: Stefan Brabec, Starnberg (DE)

(73) Assignee: Tomtec Imaging Systems GmbH (DE)

( * ) Notice: Subject to any disclaimer, the term of this patent is extended or adjusted under 35 U.S.C. 154(b) by 0 days.

(21) Appl. No.: 11/912,406

(22) PCT Filed: Jan. 16, 2007

(86) PCT No.: PCT/EP2007/000336
§ 371 (c)(1),
(2), (4) Date: Oct. 24, 2007

(87) PCT Pub. No.: WO2008/086820
PCT Pub. Date: Jul. 24, 2008

(65) Prior Publication Data
US 2009/0315888 A1    Dec. 24, 2009

(51) Int. Cl.
*G06T 11/20* (2006.01)
*G09G 5/22* (2006.01)

(52) U.S. Cl.
USPC .................................. 345/440; 345/440.1

(58) Field of Classification Search ................ 345/418, 345/619, 440; 600/453, 437, 441
See application file for complete search history.

(56) References Cited

U.S. PATENT DOCUMENTS

| | | | |
|---|---|---|---|
| 5,402,533 A | | 3/1995 | Kelley |
| 5,628,321 A | * | 5/1997 | Scheib et al. ............ 600/453 |
| 5,724,974 A | * | 3/1998 | Goodsell et al. ........... 600/453 |
| 5,735,797 A | * | 4/1998 | Muzilla et al. ............ 600/441 |
| 7,044,913 B2 | * | 5/2006 | Shiki ......................... 600/454 |
| 7,110,474 B2 | * | 9/2006 | Kokkonen et al. ........ 375/324 |
| 7,245,746 B2 | * | 7/2007 | Bjaerum et al. .......... 382/128 |
| 7,678,048 B1 | * | 3/2010 | Urbano et al. ............ 600/437 |
| 7,744,538 B2 | * | 6/2010 | Sumanaweera et al. .... 600/455 |
| 2003/0103573 A1 | * | 6/2003 | Woo et al. ................ 375/245 |
| 2004/0207625 A1 | * | 10/2004 | Griffin et al. ............. 345/440 |
| 2004/0246252 A1 | * | 12/2004 | Morrow et al. ........... 345/440 |
| 2006/0094963 A1 | | 5/2006 | Sumanaweera |
| 2007/0136409 A1 | * | 6/2007 | Tonomura et al. ........ 708/290 |

OTHER PUBLICATIONS

Thevenaz, P. and Blu, T. and Unser, M.; "Image interpolation and resampling" Handbook of Medical Imaging, Processing and Analysis, [Onlin] 2000, pp. 1-39, XP007902097; Retrieved from the Internet: URL:http://bigwww.epfl.ch/publications/thevenaz9901.pdf> [retrieved on Apr. 19, 2007] p. 18, figure 8.

* cited by examiner

*Primary Examiner* — M Good Johnson
(74) *Attorney, Agent, or Firm* — Cantor Colburn LLP

(57) ABSTRACT

The present invention relates to a method and system for graphic representation of dynamic information from a dynamic 2D or 3D object. In particular, the invention relates to a novel method of interpolating dynamic information having values of different signs. The method of the present invention is particularly useful for the graphic representation of dynamic information, in particular flow data which has been acquired with a color-Doppler-method. The method of the invention can be used for representing the flow of liquids, such as blood and is therefore useful for human and animal diagnostics.

15 Claims, 4 Drawing Sheets

(A) (state-of-the-art)

(B) (state-of-the-art)

(C1) (invention)

(C2) (invention)

METHOD AND A SYSTEM FOR GRAPHIC REPRESENTATION OF DYNAMIC INFORMATION

BACKGROUND OF INVENTION

The present invention relates to a method and system for graphic representation of dynamic information from a dynamic 2D or 3D object. In particular, the invention relates to a novel method of interpolating dynamic information having values of different signs.

The method of the present invention is particularly useful for the graphic representation of dynamic information, in particular flow data which has been acquired with a colour-Doppler-method. The method of the invention can be used for representing the flow of liquids, such as blood and is therefore useful for human and animal diagnostics.

Although, in principal, any dynamic information can be represented, dynamic information in the sense of the present invention means in particular flow data, such as colour flow data as gained from Doppler sonography measurements. Sonography can be enhanced with Doppler measurements which employ the Doppler effect to assess whether structures, such as blood, are moving towards or away from the probe, and its relative velocity. By calculating the frequency shift of a particular sample volume, for example a jet of blood flow over a heart valve, its speed and direction can be determined and visualised. This is particularly useful in cardiovascular studies and the study of other organs, such as the liver etc.

Doppler ultrasound sonography can be used in continuous wave systems and pulsed wave systems. However, continuous wave Doppler ultrasound is unable to determine the specific location of velocities within the beam and therefore, cannot be used to produce colour flow images. On the other hand, pulsed wave ultrasound methods allow the measurement of the depth or range of the flow site. For colour flow images, pulsed wave ultrasound is used to generate the data for Doppler sonograms.

For display, the dynamic information is conveniently mapped to different colours. The hue of a colour represents the direction and the brightness or shade represents the magnitude of velocity. Usually, two different or contrasting colours, such as red and blue, are used to represent the two opposing flow directions (positive or negative). In general, the colour red is used for flow towards the probe and blue is used for flow away from the probe. When an interpolation operation is performed between two values which have different signs, such an interpolation of colours may produce colours outside the velocity colour map, resulting in misleading colour flow information and their corresponding graphics, such as black or white border lines.

In order to visualize colour flow data represented as sampled volume data, special care has to be taken to reconstruct so called "aliasing effects", which occur on borders between high negative-high positive flow regions. Normal tri-linear interpolation methods are not suitable for such border regions because they do not emphasize them enough. When pulses are transmitted at a given sampling frequency or pulse repetition frequency, the maximum Doppler frequency that can be measured unambiguously is half the pulse repetition frequency. If the blood velocity and beam/flow angle being measured combine to give a Doppler frequency value greater than half of the pulse repetition frequency, ambiguity in the Doppler signal occurs. This ambiguity is known as aliasing. In the prior art, attempts have therefore been made to increase the pulse repetition frequency in order to avoid aliasing. However, the problem with increasing the pulse repetition frequency is that low velocities may not be identified. Therefore, other ways of avoiding aliasing affects is to use different methods of interpolation.

For this reason, the prior art proposes the use of minimum arc interpolation. Such an interpolation method and system is described in US 2006/0094963 A1 by Sumanaweera et al. This document teaches exact modelling of the minimum arc interpolation which results in a rather complex sign computation carried out for interpolation. Such computations are very hard to implement efficiently on graphics hardware.

Another approach disclosed in US 2006/0094963 A1 splits the velocity into a real/complex number representation which is interpolated separately and is later combined using a pre-computed lookup-table (LUT). This sampled lookup-table can lead to numerical artefacts due to limited precision and interpolation errors when sampling the LUT.

Especially for trigonometric functions (arctan 2), normal byte-values do not provide enough precision and will produce artefacts. Moving to higher precision is only possible on recent GPUs (graphics processing unit) and will result in a severe performance drop.

Another disadvantage of the prior art method is the use of the minimum arc interpolation itself. A small change in input values can lead to a drastic change in velocity. This is the case when the interpolation direction along the arc suddenly changes its direction. Using composition based volume-rendering (where a number of slices through the volume is combined back-to-front or front-to-back), these sudden changes in direction can lead to noticeable artefacts ("grizzling-effect").

BRIEF SUMMARY OF INVENTION

The invention provides a method for image rendering which avoids the disadvantages of the prior art at least to a certain extent.

The invention particularly provides a method for graphic representation of dynamic information from a dynamic two-dimensional or three-dimensional object, the method comprising:
 (a) providing dynamic information from said dynamic object,
 (b) encoding the dynamic information by splitting it into an absolute value and a direction value and mapping the absolute value and the direction value to separate bits of one or more bytes,
 (c) separately interpolating the absolute value and the direction value to give two separate values,
 (d) combining the two separate values obtained in step (c), and
 (e) representing the combined values from step (d).

The invention further relates to a system comprising an ultrasound system which provides dynamic information, and an image processing sub-system, comprising a graphics processing unit (GPU) and a display device, wherein the image processing sub-system is programmed to perform the method of the invention. The invention further relates to a computer program product for the representation of dynamic information, stored on a computer usable medium or system of the invention, and comprising software code portions capable of performing the method of the invention.

The present invention can be used to visualize any kind of dynamic information, in particular velocity information e.g. flow data, especially colour flow data such as obtained from Doppler sonography.

One of the main applications of the present invention is the representation of colour flow data obtained from the analysis of blood flow. The exact representation of the blood flow of the human heart is extremely useful for the examination of heart function. Apart from the heart, the flow of blood in other organs such as veins and arteries, the umbilical cord etc. can also be graphically represented using Doppler sonography with the interpolation method of the present invention.

However, the interpolation method of the present invention is not limited to merely Doppler sonography but it can be used for any sets of data where the above-mentioned ambiguities and aliasing effects can occur. The data may be acquired e.g. by an appropriate ultrasound probe or from an offline source. This invention is especially suited for a hardware-accelerated rendering system (GPU graphics processing unit) but it is also suitable for software based reconstruction and rendering running on a standard CPU.

The method of the present invention yields visually pleasing images, the graphics of which are more user-friendly, and which can be implemented very efficiently on the GPU. Furthermore, the present invention has the advantage of allowing for a very compact data representation that can be used in systems where memory consumption is critical.

In particular, the present invention avoids the complicated and memory consuming minimum arc interpolation as used in the prior art and allows instead for the usage of simple tri-linear interpolation for the absolute velocity values. This is made possible by separately interpolating the absolute velocity value and the direction value to give two separate values which are later combined to give a signed (plus or minus) velocity value.

The method of the present invention can be carried out in a number of ways. For example, in one particular embodiment, the dynamic information is encoded in a single byte which has the advantage of low memory consumption. In this embodiment, the sign which indicates the velocity direction is mapped to the least significant bit of the eight bits (usually the least significant bit is the lowest bit), and the absolute velocity values are mapped to the remaining upper bits. Thus, encoding is a simple bit operation for which no lookup-table is required.

The present inventors have surprisingly found that it is advantageous to encode the sign in the lowest bit and to use the other upper, especially seven bits for the velocity value. If this representation were interpolated linearly, e.g.

$$y=t*V1+(1-t)*V2$$

with t being the interpolation factor and V1 and V2 representing the two bytes, the lowest bit (direction or sign) in V1 and V2 does not have a significant effect. Since the upper seven bits represent the absolute value, linear interpolation is suitable for the value. For the representation (LUT), the direction has to be determined (positive or negative). Because linear interpolation "waters down" the direction bit, it is necessary to interpolate a second time. For this, the nearest neighbour interpolation is used which means that in the case of V1 and V2 and the interpolation factor t, either V1 or V2 is used, depending whether t is nearer to V1 or to V2. If t is less than 0.5, V1 is used, if it is equal or more than 0.5, then V2 is used. In contrast to linear interpolation, either V1 or V2 is selected but no values which lie in between. This means that from this value, the direction bit can be extracted (lowest bit). From the two separately interpolated values, the final results can be combined. The upper seven bits from the linearity interpolated V1/V2 (absolute value) and the sign from the lowest bit of the nearest interpolated V1/V2.

Normally, if colour is encoded in one byte according to prior art techniques, it is disadvantageous to use simple tri-linear interpolation when accessing the value using 3D texture mapping because interpolating between a negative and a positive direction would result in a zero crossing. This zero crossing is depicted in the graphic representation shown in FIG. 2(A).

The present invention avoids this problem by encoding the sign value of a given dynamic information value in one bit and using the other seven bits for mapping the absolute velocity value and accessing this data twice, once using a tri-linear interpolation for the absolute velocity and a second time for interpolating the direction value. Depending on the system on which the invention is implemented, the separate interpolating steps can be carried out simultaneously or consecutively. The direction value is interpolated by nearest neighbour filtering. As already explained above, the sign value must be derived by nearest neighbour filtering because the sign of only one of V1 and V2 is used if they are different.

In the end, the two values are combined into one signed value. For this, a direct approach can be used (e.g. masking out) or, a lookup-table can be employed. In the case of direct bit manipulation, the combination of the two values is easy. In the case of a GPU implementation, this step is more difficult. However, this is where one can use a lookup-table approach, i.e. a two-dimensional table which has all the possibilities of combination calculated in advance, which then allows to dispense with bit manipulation.

It is also possible to use an alternative combination mode using a pre-computed two-dimensional lookup-table. When colour is encoded such that the lowest bit has the sign (i.e. the direction), and the upper seven bits encode the absolute value, the graphics hardware can be used to get a smooth colour transition. Preferably, the abs(dir) should map to 0xFe (==254) for the maximum negative and positive direction which may involve an inversion of one of the directions. The GPU then takes the upper seven bits of the interpolated colour value, while the sign (direction) is chosen depending on the lowest bit of the nearest filtered texture.

Preferably, two texture stages are used to extract a scalar volume from the three-dimensional colour data volume. Those stages have the same 3D-volume as the input, but stage 0 uses linear filtering (tri-linear interpolation) whereas stage 1 uses nearest filtering (choosing the voxel that is nearest to the given lookup-position).

The shader (GPU fragment program) then uses the interpolated value from stage 0 to determine the absolute velocity (no sign) by masking out the lowest bit. This interpolation works since the lowest bit (containing the sign) does not contribute much to the interpolation result, so it can be kept during interpolation.

Using the value from stage 1 which was obtained using nearest filtering (thereby not interpolated) an appropriate sign (direction) value can be extracted.

Finally, the two values are combined into a signed, interpolated velocity value that can be written to the frame buffer or further processed using a colour lookup-table (LUT). This LUT usually maps positive directions to one colour and negative directions to a second colour (usually red for positive and blue for negative) so it is a simple one-dimensional LUT that can be sampled using the new velocity value. This is the preferred mode when rendering volumes using alpha-blended compositing.

With the method mentioned above, it is possible to do maximum colour velocity projection when rendering the colour part since all that is necessary is to use a maximum operation when writing the new velocity value to the frame buffer. Such operation uses the same effect as mentioned above: Since the lowest bit (containing the sign) does not contribute much to the interpolation result, the use of a maximum operator will select the maximum value as represented in the upper seven bits.

In the final rendering step, when all slices have been combined, the resulting velocities are mapped to display colour values (e.g. red and blue) by using a one-dimensional lookup-table.

Since the combination of sign and absolute value can be a tricky operation to implement on the GPU (since GPUs usually operate on fixed or floating point data, so there is no direct support for bit-operations), the present invention also proposes another combination method. Instead of first computing the signed value as output=sign?(absVal|0x1):absVal;

and then using this value to access a one-dimensional colour mapping LUT to map the velocity to screen colours, the method of the invention can be modified to use a two-dimensional colour LUT where the results of the two texture stages are used (the absolute value and the sign value) as an index into a 2-dimensional LUT which was generated in a pre-processing step.

In another preferred embodiment of the present invention, the dynamic information is not encoded by a single byte but instead by two bytes. This doubles the memory consumption, so this volume can be stored as a two-channel volume texture, e.g. a so-called luminance-alpha format in Open GL or DirectX. As with the first preferred embodiment, the simple split into absolute value and sign value is also carried out here. This avoids the complicated real/complex conversion as described in the prior art. The signed velocity value is given one byte and a second byte is added where only the absolute value of the original velocity value is stored. These two bytes are preferably stored interleaved in memory. In case of a GPU-based implementation, a two-component unsigned byte format is preferred, such as Luminance-ALPHA. Additional channels can also be interleaved such as turbulence, b-mode etc.

It is then merely necessary to use a single tri-linear interpolation lookup to extract two interpolated values from this data set. The new second channel gives the interpolated absolute velocity v_abs (as in the first embodiment), but since it is not necessary to carry a sign bit inside this byte, the full eight bit precision is maintained.

Choosing an appropriate sign is based on the first byte (the original minus dir/+dir velocity value). A simple check is carried out whether the interpolated value has a positive or negative direction and this sign is applied to the value of v_abs, the interpolated absolute value. FIG. 5 is a schematic representation of this process.

This way, the sample points with higher velocity have more influence on the direction.

This operation is a very simple comparison operation and can be implemented on nearly all GPUs. If the signed velocity is used to index a one-dimensional colour mapping LUT, we can also apply the two-dimensional LUT mechanism proposed in the first embodiment. This way, the two-dimensional index would consist of the interpolated absolute velocity and the interpolated signed velocity.

The second embodiment described above results in better quality of the image since everything spaced on interpolated values rather than on a mix of interpolated and non-interpolated texels, such as generated by the method according to the prior art US 2006/0094963 A1. The modified sign/value mapping is smooth, meaning that a slight change in velocity never results in a big colour change. This is depicted in FIG. 2(C2) (compared to FIG. 2(C1) which uses the first embodiment).

Both methods according to the first and second embodiment use a rather simple encoding mechanism which can also be realized on the GPU itself. Since most GPUs are based on a unified memory model, a shader can be applied for the velocity conversion and perform a so-called textured blit. This way, the consumption of valuable CPU power is reduced by moving workload to the GPU.

For the interpolation method of the second embodiment of this invention where data is doubled from a one-byte to a two-byte representation, this approach will also reduce the band width from system memory to GPU memory since only the original data is transferred.

For both methods, the encoding of velocity data in either packed sign-value or two-byte sign value is a very simple operation and can thereby be implemented with high performance. In contrast to the prior art, no lookup-table or complex trigonometric operations are required during conversion. The conversion according to the present invention can be implemented with simple processor instructions (compare and bit-change). A variant of this conversion will do the conversion on the GPU.

In addition, the proposed interpolation methods can also be used for reconstructing a Cartesian data set out of an acoustic representation (raw data). During this reconstruction, an interpolation scheme for velocity is needed.

Again, the two embodiments mentioned above can also be used here. The main benefit of the first embodiment using a single byte representation is that the colour flow data is rearranged and/or modified in such a way that the graphic card's tri-linear interpolation unit can be utilized to process the most performance critical part of the colour flow interpolation which fetches the eight neighbouring voxels and combines them to one scalar value. Using this tri-linearly interpolated value, it is then possible to extract the flow value as well as the direction using a very simple shader or to combine this operation into a colour LUT. The proposed method also works for purely CPU-based approaches when there is for example already a fast tri-linear lookup engine that can be used. Another benefit is that this method has very low memory consumption which is advantageous for low end systems or systems with limited amount of memory, such as mobile devices or GPUs used in laptops etc.

The advantage of the method according to the second embodiment using the sign value mapping is that the interpolation is overall smooth since there are no situations when e.g. a small change in flow results in a large change in the visualization. Compared to the prior art, there are no numerical problems due to splitting using trigonometric mappings or performance problems due to lookup-tables with high numerical precision and size. Furthermore, the methods of the invention can be efficiently implemented on the GPU without the need of an additional lookup-table because signed velocity combination is very simple.

According to another embodiment of the present invention the proposed interpolation methods can also be used for filtering (low-pass, noise-reduction . . . ) of colour-flow-data. With the conversion of colour-flow-data (signed dynamic information) into data formats which can be interpolated using standard linear interpolation it is possible to apply a filtering method to the raw or reconstructed data. The original colour-flow-data is first converted into the sign/value format and then a standard filter implementation can be run on one or on both channels depending on whether a one-byte-sign/value representation or a two-byte-sign/value representation had been chosen. After filtering the results may be converted back to the original colour-flow format or further processed in the sign/value representations that is in the one- or two-byte format.

One special variant applies to the two-byte-sign/value representation: for most applications it may be sufficient to only filter that channel which contains the absolute velocity wherein the sign-channel remains unfiltered. This would result in a slightly different image with the benefit of only filtering one channel instead of two, e.g. less computing time.

With such embodiment of the present invention it is possible to use colour-flow-data in the original form, apply a noise-reduction filter (e.g. a convolution-based Gaussian smoothing filter), convert the data back to the original form and reconstruct or interpolate the data by using the minimum-arc technique. For colour-flow ultra-sound it is important to get rid of the high frequencies in the volume data so an appropriate filtering step is mandatory to achieve good image quality. With the proposed sign/value (two-channel) representation all well-known standard filtering techniques can be used. Such filtering can be used for three-dimensional data, two-dimensional data or one-dimensional data (e.g. raw ultrasound beams).

The proposed method of the invention in all its embodiments is especially suitable for realtime ultrasound imaging. A possible realization may consist of an ultrasound system consisting of an ultrasound probe to acquire velocity data (colour flow). Alternatively, acquired data stored for later review can be used (offline review system without probe etc.). Further, an image processing sub-system is present, comprising a graphics processing unit (GPU) and a display device. Alternatively, an image processing sub-system can be employed where all processing is done on the CPU.

In this example, the velocity data is given as a three-dimensional data set. This data is then converted to one of our two representations on either the CPU or GPU. In the case of CPU processing, the converted three-dimensional data set is then transferred to the GPU. In order to visualize the results, the GPU extracts (renders) one or more slices using this input data. Since this step requires re-sampling of the input data at arbitrary spatial locations, it is possible to use one of the two interpolation methods to calculate a signed velocity value. For three-dimensional data, the GPU or CPU therefore fetches the eight neighbouring voxel data samples and performs the interpolation. This interpolated result is then used as input for a display colour lookup-table or further processed to perform e.g. maximum velocity projection. It should be noted that although the present invention is especially suited for three-dimensional data, it can also be applied to two-dimensional images, e.g. in the case where only a single slice is acquired.

BRIEF DESCRIPTION OF THE DRAWINGS

The invention will now be described in more detail in the following figures and examples.

FIG. 1(A) shows normal linear interpolation, FIG. 1B minimum arc interpolation and FIG. 1(C) sign/value mapping according to the present invention.

FIG. 2(A) shows normal trilinear interpolation between two values A and B. FIG. 2(B) shows minimum arc interpolation. FIG. 2(C1) and FIG. 2(C2) show the two interpolation graphs according to the first and second embodiment of the invention.

DETAILED DESCRIPTION OF THE INVENTION

Figure 1:
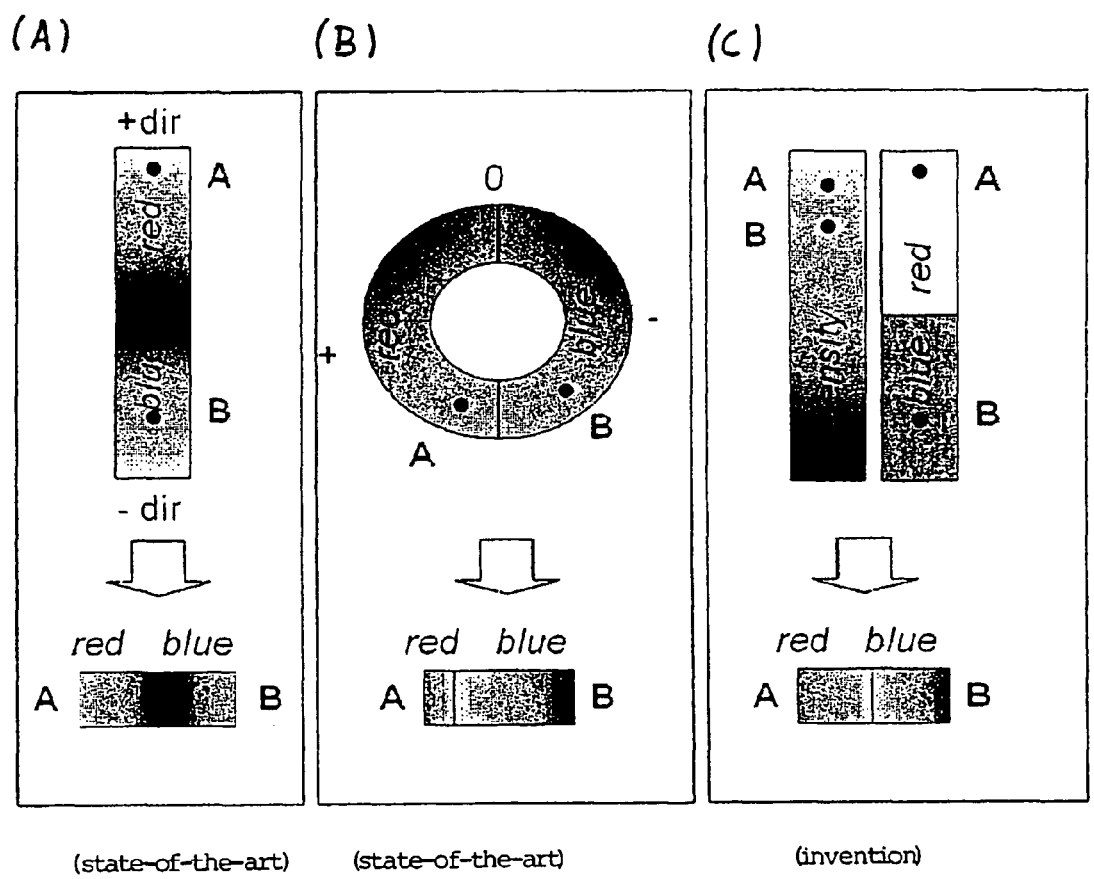
FIG. 1(A) to (C) shows the difference between three interpolation approaches.

In FIG. 1, the three images (A) to (C) show the differences between the various interpolation approaches. In all three cases, the region between A and B is to be interpolated. The two values A and B have high values but opposite directions e.g. opposite signs. The opposite directions are indicated by different colours, red for positive and blue for negative directions. The shading intensity indicates the absolute velocity value. With normal interpolation as depicted in FIG. 1(A) using standard texture filtering, the interpolation results in a zero crossing region. The positive value of A is decreased until it reaches zero and then rises up again to the value of B. The disadvantage is that when such result is graphically represented, the zero crossing line would result in a colour which is outside the colour scheme of the graphics, i.e. a white line or a black line, and this would make the image confusing for the user.

With minimum arc interpolation as depicted in FIG. 1(B), the interpolation direction is along the minimum distance from A to B when they are arranged as depicted in a circular manner. So the value of A rises up until it reaches maximum intensity, then flips the sign and then moves from the highest blue value to the value of B.

Finally, FIG. 1(C) depicts the sign/value mapping interpolation of the present invention. On the left, the two values A and B are shown in the grey shaded box where they are placed at the respective intensities independent of the sign. In the box on the right, the values A and B are placed according to the direction (positive or negative) which is depicted as either red or blue. The interpolation is carried out separately. In contrast to minimum arc interpolation, the intensity of either value is never below or above the actual value of A or B. The direction (sign) change is determined by nearest neighbour filtering, so the point of turn is always in the middle of the |AB| region.

Figure 2:
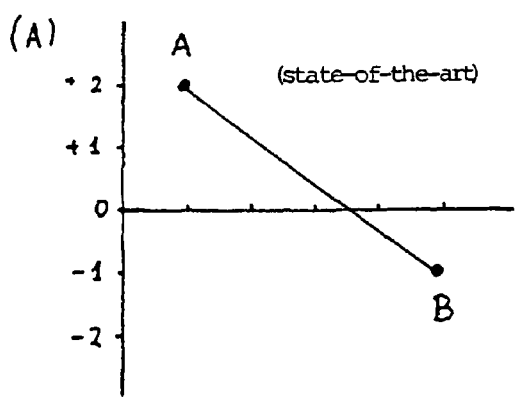
FIG. 2 shows four different graphs representing the four different interpolation methods.
Figure 2:
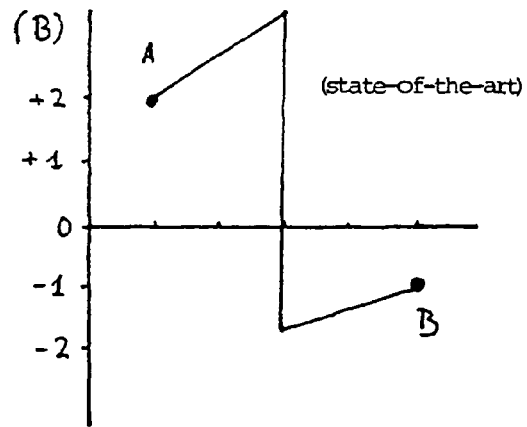
Figure 2:
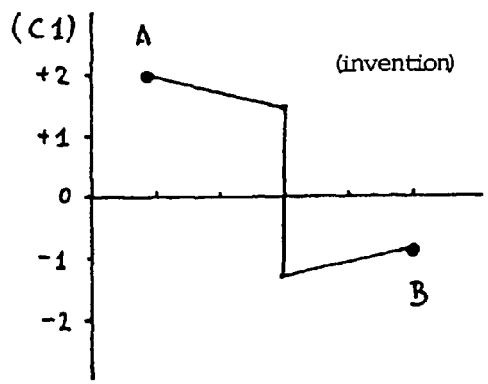
Figure 2:
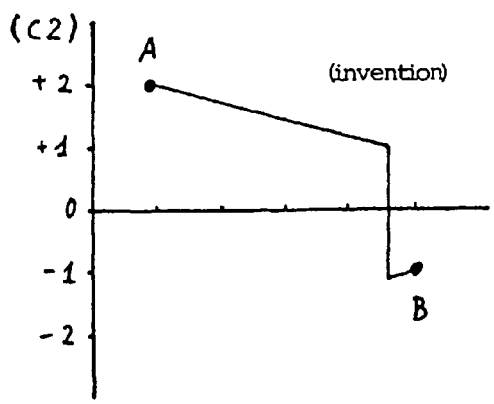

FIG. 2 shows mathematical graphs depicting the various interpolation methods as shown in FIG. 1. FIG. 2(A) and FIG. 2(B) show normal and minimum arc interpolation, whereas FIGS. 2(C1) and 2(C2) show the interpolations according to the present invention, where FIG. 2(C1) shows the interpolation according to the first embodiment and FIG. 2(C2) shows the interpolation according to the second embodiment. In the first embodiment, which is depicted in FIG. 2(C1), the sign is determined by nearest neighbour filtering, i.e. the crossing from one direction to the other takes place midway between the absolute values A and B. Thus, the crossing is always at t equals 0.5. In FIG. 2(C2), the sign is interpolated linearly. In this case, value A, which is higher than value B, consequently has a bigger effect on the sign. Therefore, the crossing between positive and negative takes place at the point where A becomes smaller than B in terms of absolute value.

Figure 3:
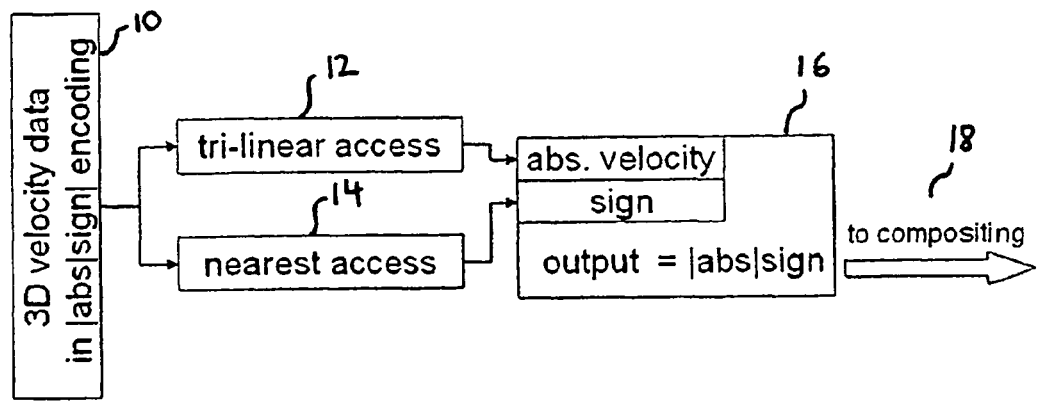
FIG. 3 shows a flow diagram for combining the sign and absolute value using bit operations.

FIG. 3 shows a flow diagram for combining the sign and absolute value using bit operations. In step 10, three-dimensional velocity data is obtained and encoded in one byte by splitting the absolute value and the sign value of each data point and encoding the sign value on one bit and using the other seven bits for encoding the absolute value. Subsequently, two operations are performed as shown in steps 12 and 14. In step 12, the absolute value is interpolated using tri-linear interpolation. In step 14, the sign value is interpolated using nearest neighbour interpolation. Two values are obtained, i.e. the absolute velocity and the sign value which are depicted as two separate boxes in box 16. The two values are then combined to give a combined interpolated output value which is then used for compositing (in step 18).

Figure 4:
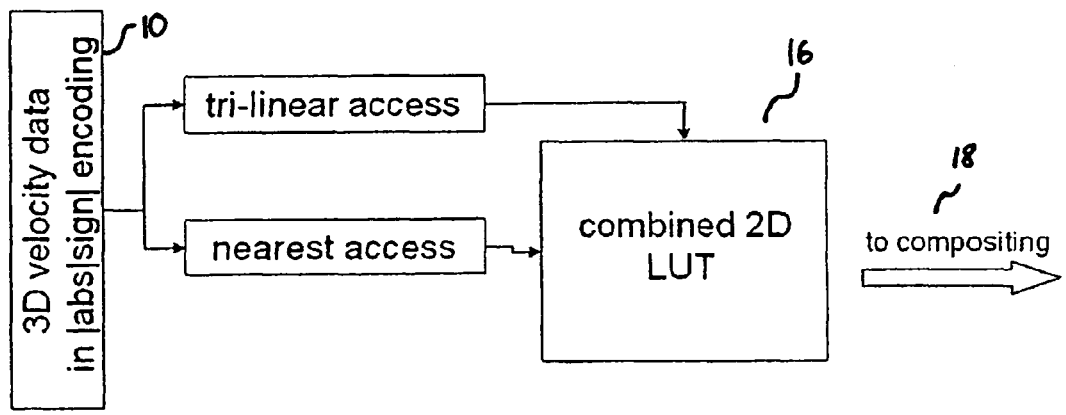
FIG. 4 shows a flow diagram for combining the sign and absolute value using a two-dimensional lookup-table that was generated in a pre-processing step.

FIG. 4 shows a flow diagram essentially of the same process with the exception that for combining the two separate interpolated values for the absolute value and the sign value, a combined 2D lookup-table is used.

Figure 5:
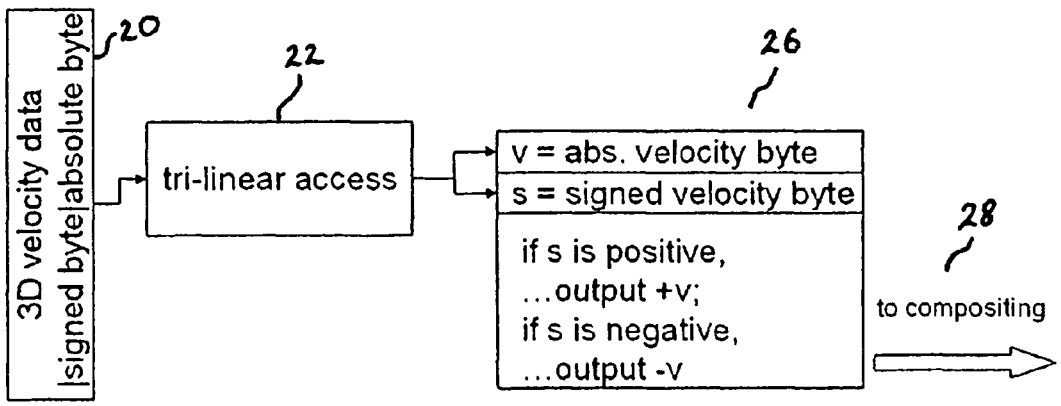
FIG. 5 shows a flow diagram for combining the sign and absolute value using interpolated absolute velocity and interpolated sign velocity from a two-channel 3D data set.

FIG. 5 shows a flow diagram representing the second embodiment of the method of the present invention, where the three-dimensional velocity data is encoded on two bytes, one byte for the sign value and one byte for the absolute value. This is depicted in box 20. In box 22 a tri-linear interpolation is performed independent of the sign value. The sign value is taken into account only in step 26. If the sign is positive then the output value obtained from the tri-linear interpolation is given as a positive value, and if the sign is negative, then the interpolated value is provided with a negative sign. Step 28 corresponds to step 18 as in FIGS. 3 and 4.

Figure 6:
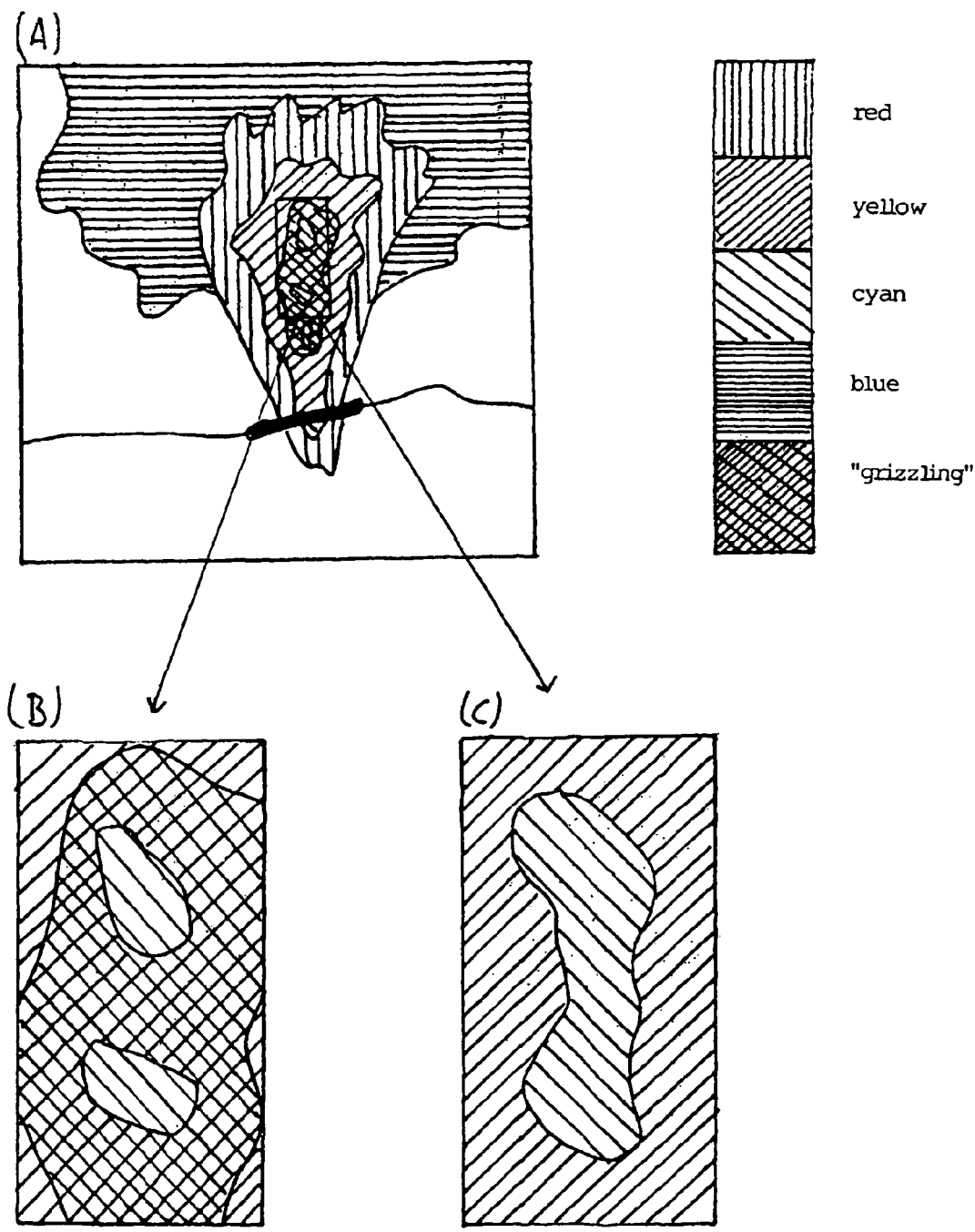
FIG. 6 shows a schematic image of an area of blood flow in the human heart as represented by the Doppler using the interpolation method of the present invention.

FIG. 6 shows a schematic representation of the colour flow image generated by Doppler sonography. FIG. 6A shows the schematic representation of an image where the values have been interpolated using minimum arc interpolation of the prior art such as disclosed in US 2006/0094963 A1 by Sumanaweera et al. The different colours are represented by differently shaded areas. The black bar represents heart valve and the hatched areas represent the blood flow through this heart valve. As can be seen already from FIG. 6A, there is an area in the centre of the jet of blood where isolated islands of cyan coloured areas are present within an area which is in general yellow. The crossover between yellow and cyan is the inversion of the sign. Thus, blood flow marked yellow and red flows in the opposite direction to blood flow marked cyan or blue. The enlargement of the central area shown in FIG. 6B shows that around the cyan coloured islands, there is an area which is doubly hatched. This represents an area where the so-called grizzling effect occurs. This means that due to interpolation errors, there are very small areas of different colours adjacent to one another, usually in the form of elongated areas which to the naked eye look like lines (e.g. yellow and cyan). This means that there is ambiguity as to the direction of the flow. When the interpolation method according to the present invention is used, the same enlarged area shown in FIG. 6C now shows no grizzling effect. Instead, the yellow and cyan areas are well-defined.

The invention claimed is:

1. A method for graphic representation of dynamic information from a dynamic two-dimensional or three-dimensional object, the method comprising:
(a) providing dynamic information from said dynamic object in a form of a single originally signed velocity value,
(b) encoding the dynamic information by splitting the single originally signed velocity value into an absolute value of the single originally signed velocity value and a signed value that is the single originally signed velocity value and mapping the absolute value and the signed value to separate numbers,
(c) separately interpolating the absolute value and the signed value to give two separate values,
(d) combining the two separate values obtained in step (c),
(e) representing the combined values from step (d) using an image processing sub-system including a processing unit and a display device.

2. The method of claim 1, wherein in step (d) a direct approach or a lookup-table is used for combining the two separate values.

3. The method of claim 1, wherein in step (b) tri-linear interpolation is used for the absolute value.

4. The method of claim 1, wherein in step (b) nearest neighbour filtering is used for the interpolation of the signed value.

5. The method of claim 1, wherein the encoding of step (b) employs tri-linear interpolation for interpolating the signed value.

6. The method of claim 1, wherein the absolute value and the signed value are mapped to two bytes using one byte for each value.

7. The method of claim 1, wherein the lookup-table used in step (c) maps positive signed values to a first color and negative signed values to a second color.

8. The method of claim 1, wherein the dynamic information is derived from a three-dimensional object.

9. The method of claim 1, wherein the dynamic information is velocity information.

10. The method of claim 1, wherein the method is carried out using a graphics processing unit (GPU).

11. The method of claim 1, wherein the combined interpolated values from step (d) are represented as a polar plot, or a two-dimensional or three-dimensional image.

12. The method of claim 1, wherein said signed dynamic information is filtered by converting of said dynamic information into data formats which can be interpolated using standard linear interpolation and applying a filtering method to the raw or reconstructed data.

13. A non-transitory computer storable medium storing a computer software product for graphic representation of dynamic information comprising software code portions capable of performing the method of any one of claim 1.

14. The method of claim 1, wherein the mapping is a transcribing of the absolute value and the signed value into separate numbers without any further calculation steps.

15. A system for graphic representation of dynamic information from a dynamic two-dimensional or three-dimensional object, comprising
an ultrasound system which provides dynamic information, and
an image processing sub-system, comprising a graphics processing unit (GPU) and a display device,
wherein the image processing sub-system is programmed to perform the method of claim 1.

* * * * *